June 23, 1942.                  C. DE K. BLISS                  2,287,162
                             FLASH PROTECTION DEVICE
                              Filed Dec. 27, 1939
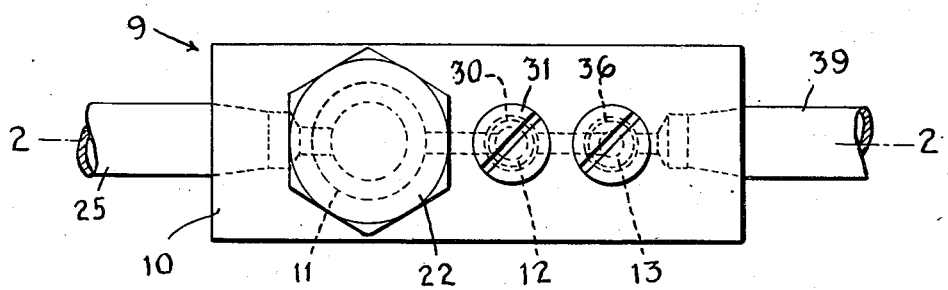
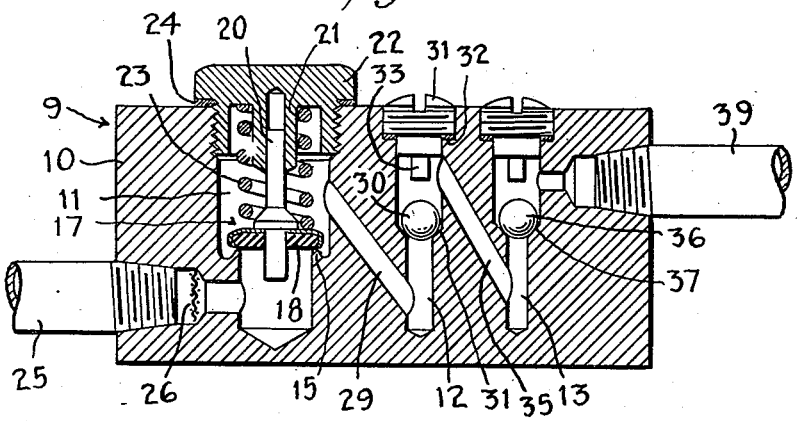
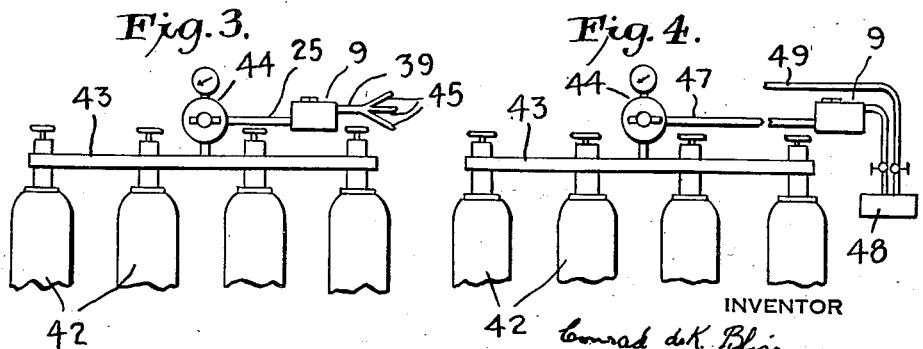
INVENTOR
Conrad de K. Bliss
BY
ATTORNEY Patented June 23, 1942

2,287,162

UNITED STATES PATENT OFFICE 2,287,162

FLASH PROTECTION DEVICE

Conrad De K. Bliss, Englewood, N. J., assignor to Air Reduction Company, Incorporated, New York, N. Y., a corporation of New York Application December 27, 1939, Serial No. 311,088

8 Claims. (Cl. 48—192)

This invention relates to apparatus for protecting gas lines from flash-backs and explosions.

When oxy-fuel gas burners are used with separate conduits for supplying the oxygen and fuel gas to a mixing chamber near the burner there is never enough volume of mixed gases to produce a severe explosion unless one of the gases can flow back into the other gas conduit and fill a substantial section of that conduit with an explosive mixture. If the gas flow from a burner becomes obstructed, for example, and back-flow in the fuel gas line is possible, the oxygen, which is ordinarly supplied at higher pressure than the fuel gas, will flow into the fuel gas line, forcing reverse flow of some of the fuel gas but mixing with enough of it to create an explosive charge.

Even with gas lines that are protected against reverse flow, explosive mixtures are likely to form beyond the valves. This occurs when the burner is not in use, because the fuel gas beyond the valve is free to escape into the atmosphere and air gets into the line through the burner and mixes with the gas in the passages between the burner and the first closed valve of the gas line. Such an air-fuel gas mixture may cause a flashback when the burner is next lighted.

It is an oject of this invention to provide improved apparatus for protecting gas lines. More particularly it is an object of the invention to prevent reverse flow and to arrest propagation of explosions by a novel combination of valves in series relation.

The invention comprises one or more heat-resistant and heat-absorbent check valves in series with and on the down-stream side of another check valve which has a seat or valve element soft enough to accommodate itself to foreign bodies that may lodge between the seat and valve element. This latter check valve seals the line effectively against reverse flow even though the other check valves are not gas-tight when closed.

In the preferred embodiment of the invention, the check valve relied upon to prevent reverse flow has a rubber insert that contacts with the valve seat. The other check valves, which are preferably of metal, protect the rubber from damaging heat and pressure by stopping flashbacks before they reach the rubber insert valve.

Other objects, features and advantages of the invention will appear or be pointed out as the specification proceeds.

In the accompanying drawing, forming a part hereof:

Fig. 1 is a top plan view of a flash protection device embodying the invention.

Fig. 2 is a sectional view taken on the line 2—2 of Fig. 1.

Figs. 3 and 4 are reduced diagrammatic views illustrating different locations at which the device is used in gas distributing systems.

The protective device 9 shown in the drawing includes three check valves in series. These check valves are preferably contained in a common housing comprising a block 10 in which there are three valve chambers 11, 12 and 13.

The block 10 is preferably brass, and a valve seat comprising a circular lip 15 in the chamber 11 is an integral part of the block. If the block 10 is made of material unsuitable for a valve seat, then this lip 15, and the valve seats in the chambers 12 and 13 are made of inserts in the chambers.

A valve element 17 has a recessed face in which is a resilient insert 18 that seats against the lip 15. This insert 18 is preferably made of rubber that is soft enough to accommodate itself to any small foreign bodies that may be on the lip 15 or on the face of the insert when it comes against the lip. This construction makes the check valve gas tight against reverse flow at all times, but the rubber is a material that is liable to damage from the heat and pressure of a flashback.

This first check valve is a poppet valve and has a stem 20 extending upward into a valve guide 21. This valve guide is connected to or integral with a cap 22 that threads into the block 10 and forms the top of the valve chamber 11. The valve element 17 is urged downward against its seat 15 by a spring 23, the upper part of which coils around the outside of the valve guide 21.

A lead washer 24 is clamped against the top of the block 10 by a shoulder of the cap 22, and serves as a gasket to prevent leakage of gas from the chamber 11.

Fuel gas from a supply line 25 flows through a screen filter 26 and into the lower part of the chamber 11 under the valve element 17. When the fuel gas shut-off valve is open, the gas pressure lifts the valve element 17 and gas flows around the valve element and into the upper portion of the valve chamber 11.

A conduit 29 connects the region of the valve chamber 11 above the valve element 17 with the lower part of the valve chamber 12. A ball valve element 30 seats against a sloping seat 31 in the chamber 12 and provides a ball check valve in series with the poppet check valve of the chamber 11. The ball valve element 30 is of heat-absorbent material, and is preferably stainless steel.

The chamber 12 is closed at its upper end by a screw plug 31 that threads into a recess in the top of the block 10 and clamps a lead gasket 32 against a shoulder of the recess. A stem 33 extending downward from the plug 31 acts as an abutment to prevent the ball valve element 30 from rising too high in the chamber 12.

The upper part of the chamber 12 is connected with the lower part of the chamber 13 by a conduit 35. A ball check valve element 36 in the chamber 13 seats against a sloping seat 37. This structure is similar to that in the chamber 12, and the upper end of the chamber is similarly closed by a screw plug threaded into the block 10. A pipe 39 connected to the block 10 communicates with the upper part of the chamber 13 and comprises a distributing line for the gas.

Even if the check valve in the chamber 13 is in bad condition so that it will permit considerable reverse flow of gas, there is little possibility that a flame will travel back beyond the valve element 36 because of the heat absorbing qualities of the valve element 36 and its seat 37. The valve chambers 12 and 13 are located close together so that even if an explosive mixture exists in the conduit 35 and a flame does succeed in propagating past the check valve in the chamber 13, the volume of gas involved is small and the heat and pressure limited. This limited heat makes it virtually impossible for a flame to pass the check valve in chamber 12.

As an added precaution, however, the chamber 11 is located close to the chamber 12 and the chambers are of such size that the volume of gas in the conduit 29 and those parts of the chambers 11 and 12 in direct communication with the conduit 29 is insufficient to develop heat and pressure enough to damage the valve element 17 even if this gas does explode.

Fig. 3 shows a bank of gas storage cylinders 42 connected with a manifold 43 which supplies high-pressure gas to a pressure regulator 44. The flash protection device 9 is connected with the low-pressure side of the regulator 44 by the pipe 25 and the delivery line 39 from the flash protection device supplies gas to a number of branch distributing lines 45. When the invention is used in this manner, it may be attached to or made a part of the manifold.

Fig. 4 shows the cylinders 42 supplying gas through the manifold 43 and regulator 44 to a single distributing line 47. The flash protection device 9 is at the outlet end of the line 47 and close to a torch 48. Fuel gas is supplied to the torch 48 through the line 47, and oxygen is supplied to the torch through another gas line 49 which has its own protective apparatus.

The preferred embodiment of the invention has been illustrated and described, but changes and modifications can be made, and some features of the invention can be used without others.

I claim:

1. Apparatus for protecting a gas line against flash-backs including in combination a first check valve biased toward closed position and comprising a seat and a valve element, one of which has a rubber face soft enough to accommodate itself, when under pressure, to foreign bodies that become lodged between the valve element and seat, means exerting a continuous predetermined force that urges said valve element toward said seat, and a second check valve on the down-stream side of and in series with the first check valve, said second check valve having a bias toward closed position and opening in the direction of gas flow, and including a seat and a metal valve element.

2. A protection device for gas lines including a soft non-metallic check valve that accommodates itself to small foreign bodies in its valve seat for preventing back flow through a gas line, a spring for holding the soft check valve closed, and a hard, heat absorbent, check valve with a bias toward closed position and in a series circuit with the soft check valve on the downstream side of the soft check valve for arresting a flash before it reaches the soft check valve.

3. A protective device for gas lines including a gas-tight check valve constructed of material that accommodates itself to small foreign bodies on its valve seat and that is subject to injury by the pressure or high temperature of a flashback, and means urging the check valve toward closed position, and a heat-resistant and heat-absorbent metal check valve independent of said gas-tight check valve and in series with and on the downstream side of said gas-tight check valve.

4. A flash preventing and arresting device including a soft check valve that accommodates itself to small foreign bodies so that such bodies do not cause the valve to leak, means independent of the gas pressure for holding said check valve closed, and a ball check valve in series with the soft check valve and located close to said soft check valve to reduce the volume of the gas conduit between the check valves.

5. In a gas line for supplying fuel gas to a torch, the combination of a gas-tight poppet valve having a surface of soft rubber or the like, means loading the poppet valve with a pressure sufficient to cause said surface to accommodate the valve to small foreign bodies on the valve seat, and one or more ball check valves in series with the poppet valve and on the torch side of said poppet valve.

6. A flash prevention device for a gas line including a common housing, two or more valve chambers in the housing, a valve seat and a poppet valve element, one of which has a rubber face, in one of said chambers, a ball check valve in one or more of the other of said valve chambers, and a connecting conduit leading through a part of said housing from a region of the poppet valve chamber above the valve element, to a region of the next valve chamber below the ball check valve.

7. A flash prevention device for a gas line, including a block in which are three chambers closed at the top by plugs that screw into the block, shoulders intermediate the upper and lower ends of each of said chambers with the upper faces of the shoulders shaped to serve as valve seats, an inlet conduit communicating with the first chamber below the valve seat, an outlet conduit leading from the upper end of the third chamber, other conduits in the block connecting the portions of the first and second chambers above the valve seats with the lower portions of the second and third chambers, respectively, a metal popet valve element above the valve seat in the first chamber, a spring urging the poppet valve element against the seat, a rubber insert located in a recess in the lower face of the poppet valve element in position to contact with the valve seat in that chamber, said rubber being sufficiently resilient to accommodate itself under the pressure of said spring to small particles of foreign matter on the valve seat, and a metal ball check valve in each of the other chambers and supported by the valve seats in said other chambers.

8. A flash protection device including in combination a first check valve comprising a chamber in which are a valve element and a valve seat, one of which has a resilient face soft enough to accommodate itself to foreign matter on the valve seat to prevent reverse flow of gas, and one or more other check valves separate from and spaced from the first check valve and in series with and down-stream from the first check valve, each of said other check valves comprising a chamber in which are a valve element and a seat, at least one of which is of heat-resistant and heat-absorbent material, and a conduit connecting the outlet end of the first check valve chamber with the inlet end of the next check valve chamber, the connected chambers being located close to one another to reduce the length of said conduit and the volume of gas between the check valves.

CONRAD de K. BLISS.